United States Patent
Honary

(10) Patent No.: US 6,771,393 B1
(45) Date of Patent: Aug. 3, 2004

(54) TRANSMISSION RATE CONTROL FOR CONTINUOUS-TONE FACSIMILE

(75) Inventor: Hooman Honary, Newport Beach, CA (US)

(73) Assignee: Conexant Systems, Inc., Newport Beach, CA (US)

(*) Notice: Subject to any disclaimer, the term of this patent is extended or adjusted under 35 U.S.C. 154(b) by 0 days.

(21) Appl. No.: 09/370,313

(22) Filed: Aug. 9, 1999

(51) Int. Cl.[7] ............................................. H04N 1/41
(52) U.S. Cl. ........................ 358/426; 358/435; 358/409; 382/250; 382/251
(58) Field of Search .................................... 358/426, 429, 358/435, 448, 298, 1.2, 522, 409; 382/250, 251

(56) References Cited

U.S. PATENT DOCUMENTS

| | | | |
|---|---|---|---|
| 5,455,874 A | * 10/1995 | Ormsby et al. | ............... 382/25 |
| 5,850,484 A | * 12/1998 | Beretta et al. | .............. 382/250 |
| 6,252,994 B1 | * 6/2001 | Nafarieh | ..................... 382/253 |
| 6,519,289 B1 | * 2/2003 | Bruck | ................... 375/240.27 |
| 2002/0001414 A1 | * 1/2002 | Sadeh | ......................... 382/250 |

OTHER PUBLICATIONS

*ITU–T Recommendation T.81 Digital Compression &Coding of Continuous–Tone Still Images*, International Telecommunications Union, (Sep. 1992).

*ITU–T Recommendation T.42 Continuous–Tone Colour Representation Method Facsimile*, International Telecommunications Union, (Nov. 1994).

*ITU–T Recommendation T.4 Annex G Optional Continuous–Tone Colour Mode for Group 3*, International Telecommunications Union, pp. 51a–51h, 52–55 (Nov. 1994).

* cited by examiner

*Primary Examiner*—Kimberly A. Williams
*Assistant Examiner*—Negussie Worku
(74) *Attorney, Agent, or Firm*—Akin Gump Strauss Hauer & Feld LLP

(57) ABSTRACT

A continuous-tone facsimile mechanism supports a transmission rate control mode to control the transmission rate of a continuous-tone image (e.g., a color image) based on the data rate between the transmitter and receiver. The transmission rate is controlled by scaling the original quantization values based on the data rate producing scaled quantization values which are then used to compress the image. The scaled quantization values are transmitted along with the compressed continuous-tone image. Via a rate control mode, a continuous-tone facsimile device with this transmission rate control technique can allow a user to specify whether the transmission rate control is activated or deactivated.

23 Claims, 5 Drawing Sheets

TRANSMISSION RATE CONTROL FOR CONTINUOUS-TONE FACSIMILE

BACKGROUND

1. Field of the Invention

The present invention generally relates to continuous-tone facsimile devices, and more particularly to controlling the facsimile transmission rate of a continuous-tone image based on the data rate.

2. Description of the Related Art

Facsimile mechanisms for black and white facsimile transmission have been available for a substantial period of time. Recently, the International Telecommunication Union (ITU) has defined a continuous-tone data representation standard in order to make it possible to interchange continuous-tone image data (e.g., color or gray scale data) over a facsimile communication service such as Group 4 or Group 3 facsimile devices.

The standard for image encoding of continuous-tone data is based upon ITU-T Recommendation T.81(JPEG), DIGITAL COMPRESSION AND CODING OF CONTINUOUS-TONE STILL IMAGES, and ITU-T Recommendation T.42, CONTINUOUS-TONE COLOUR REPRESENTATION METHOD FOR FACSIMILE, which specifies color space representation. The techniques for image transfer applied to Group 3 facsimile are a subset of Recommendation T.81 consistent with the T.81 Recommendation. The description of color components and colorimetry for color data is included in Recommendation T.42. The specification for continuous-tone color mode for Group 3 facsimile is contained in T.4 Annex G, OPTIONAL CONTINUOUS-TONE COLOUR MODE FOR GROUP 3 of ITU-T Recommendation T.4, STANDARDIZATION OF GROUP 3 FACSIMILE TERMINALS FOR DOCUMENT TRANSMISSION, the basic standard for Group 3 facsimile devices. Continuous-tone images include both color and gray-scale images.

The ITU Continuous-Tone Facsimile standard uses the baseline JPEG image compression technique prior to transmission. For this technique, the amount of compression is controlled by the values used in a quantization table that is used both in compression (on the transmission side) and decompression (on the receiver side). There has not been a correlation between the amount of compression and the data rate with which the data is being communicated. Consequently, the amount of time that it takes for a continuous-tone image to reach the facsimile receiver has been unpredictable.

SUMMARY OF THE INVENTION

Briefly, a continuous-tone facsimile mechanism provides a transmission rate control to scale an original set of quantization values, producing a scaled set of quantization values based on a data rate negotiated between a transmitter and a receiver. The scaled set of quantization values are used to produce a compressed continuous-tone image for the facsimile mechanism. Both the compressed image and the scaled set of quantization values are transmitted to the receiver. When a rate control mode of the facsimile mechanism is disabled, the scaled set of quantization values is identical to the original set of quantization values. When the rate control mode is enabled, the elements of the original set of quantization values are increased by a relatively large amount if the data rate is relatively slow and are increased by a relatively small amount if the data rate is relatively fast. The scaled set of quantization values and the data rate thus have an inverse relationship.

One advantage of this technique of transmission rate control is the ability to control the amount of data sent based on the data rate, hence fixing the communication time. In many applications, absolute quality of the transmitted image is not as important as being able to limit the amount of time required to transmit the image, even at a cost of some degradation of the quality of the image. A user of such a continuous-tone facsimile mechanism has the capability to choose between either fixing the time required to transmit the image or fixing the quality of the image and letting the time required to transmit the image vary.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following ITU documents are hereby incorporated by reference as if set forth in their entirety:

ITU-T Recommendation T.81, INFORMATION TECHNOLOGY DIGITAL—COMPRESSION AND CODING OF CONTINUOUS-TONE STILL IMAGES—REQUIREMENTS AND GUIDELINES;

ITU-T Recommendation T.4, Annex G, OPTIONAL CONTINUOUS-TONE COLOUR MODE FOR GROUP 3; and ITU-T Recommendation T.42, CONTINUOUS-TONE COLOUR REPRESENTATION METHOD FOR FACSIMILE.

The ITU Continuous Tone facsimile standard embodied in T.4 Annex G and T.42 compresses a continuous-tone (e.g., color) image to be transmitted using the T.81 (JPEG) technique, sending the compressed continuous-tone image using conventional Group 3 facsimile techniques. The T.81 describes both a baseline discrete cosine transform (DCT) and various extended DCT processes, followed by an entropy encoding procedure which can be either Huffman encoding or arithmetic encoding. However, T.4 Annex G requires use of either a baseline DCT or an extended sequential DCT process and a Huffman entropy encoding.

JPEG compression using either the baseline DCT or extended sequential DCT process first transforms 8×8 level-shifted blocks sampled from the image data using the forward DCT (FDCT) equation $$S_{vu} = \frac{1}{4} C_u C_v \sum_{x=0}^{7} \sum_{y=0}^{7} s_{yx} \cos\frac{(2x+1)u\pi}{16} \cos\frac{(2y+1)v\pi}{16}$$

where $C_u, C_v = 1/\sqrt{2}$ for u,v=0

$C_u, C_v = 1$ otherwise.

The symbols $C_u$ and $C_v$ are constants. The symbol $s_{yx}$ is the sample element in row y and column x of the 8×8 block, where $s_{00}$ is the top left element. $S_{vu}$ is the DCT coefficient generated by the FDCT transformation in the row v and column u, where $S_{00}$ is the top left DCT coefficient.

In the conventional JPEG compression, the DCT coefficients are then quantized using a quantization table using the formula $$Sq_{vu} = \text{round}\left(\frac{S_{vu}}{Q_{vu}}\right)$$

where rounding is to the nearest integer. $Q_{vu}$ represents the scaled quantization value in row v and column u of the scaled set of quantization values 550 described in conjunction with FIG. 5. The symbol $Sq_{vu}$ is the quantized DCT coefficient in row v and column u. The symbol $S_{vu}$ is the corresponding element of the set of quantized DCT coefficients. These quantized DCT coefficients are then encoded using the entropy encoding according to T.81 to further compress the data. The effect of quantization is to normalize the DCT coefficients. For complete details on the JPEG compression technique, see T.81, previously incorporated by reference. JPEG compression and entropy encoding are understood to those in the art.

Figure 1:
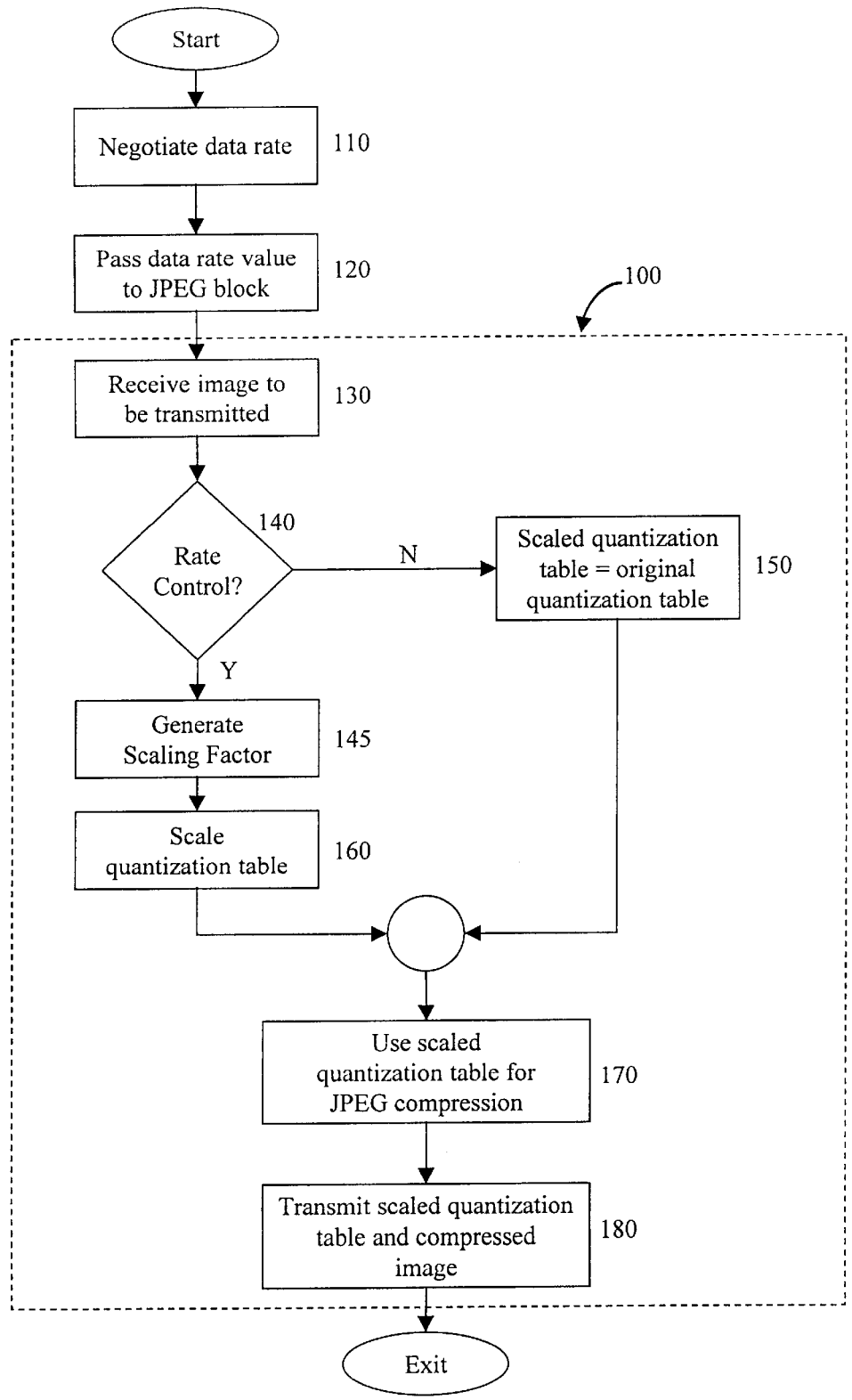
FIG. 1 is a flow chart of a technique of controlling the transmission rate of an image.

Turning now to the drawings, FIG. 1 shows a flow chart of an exemplary technique to apply a transmission rate control to a continuous-tone image for facsimile transmission. A data rate for the transmission of the continuous-tone image is first negotiated in step 110. In a disclosed embodiment, the data rate is negotiated between a transmitter modem 230 (FIG. 3) and a receiver modem 370 (FIG. 3) using techniques well known in the art. In step 120, the negotiated data rate is passed to a JPEG module 100. In the context of the present disclosure, the JPEG module 100 refers to software to perform a transmission rate control technique described below in combination with standard JPEG compression techniques. The data rate can be passed as a parameter or by any other technique known in the art.

The JPEG module 100 receives a continuous-tone image to be transmitted in step 130. Next, in step 140 the process determines whether or not to apply transmission rate control. One skilled in the art will understand that this determination can be accomplished in a variety of ways. If transmission rate control is to be applied, an original set of quantization values is scaled. In one embodiment, a scaling factor is generated from the data rate in step 145 and then used to scale the original set of quantization values in step 160. In a disclosed embodiment, the scaling factor is an integer value, and each member of the original set of quantization values is multiplied by the scaling factor to produce a scaled set of quantization values. One skilled in the art will recognize that various techniques for producing a scaled set of quantization values from the original set of quantization values can be used without departing from the spirit of the invention. In particular, steps 145 and 160 can be combined into a single step of scaling the original set of quantization values to produce a scaled set of quantization value without separately computing a scaling factor. If the data rate is relatively low, then a relatively large scaling factor will be used, producing a scaled set of relatively large quantization values. If the data rate is relatively high, then a relatively low scaling factor will be used, generating a scaled set of relatively low quantization values. In one embodiment, the scaled set of quantization values and scaling factor vary inversely with the data rate. If transmission rate control is not to be applied, then in step 150 the scaled set of quantization values is generated identical to the original set of quantization values. Once the scaled set of quantization values are defined, the image is quantized using the scaled set of quantization values in step 170 according to the JPEG standard. Finally in step 180, the scaled set of quantization values and the compressed image are transmitted to the receiver.

Figure 2:
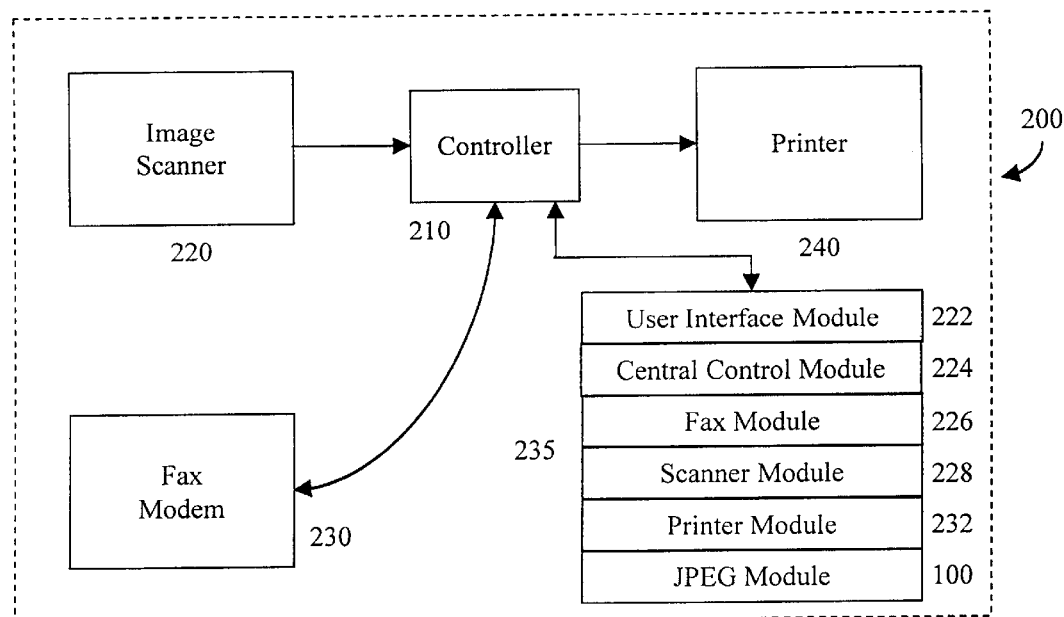
FIG. 2 is a block diagram of a color facsimile device using the technique of FIG. 1.

FIG. 2 shows a simplified block diagram of a continuous-tone facsimile device 200. The facsimile device includes an image scanner 220, a controller 210, a printer 240, a fax modem 230 and a read-only memory (ROM) 235. The image scanner 220 scans an image, passing a digitized representation of the image to the controller 210 having the associated read-only memory for firmware storage. The controller 210 can include a processor core, user interface logic, print control logic, compression/decompression logic and scanner control logic, for example. The ROM 235 is shown storing a user interface module 222 for user interface functions, a central control module 224 to provide centralized control functions, a fax module 226 for operating the fax modem 230, a printer module 232 to communicate with the printer 240 and the JPEG module 100 described in conjunction with FIG. 1. The controller 210 obtains the data rate from the fax modem 230 and compresses the image in accordance with the process of FIG. 1. After the image compression, the controller 210 transmits the compressed image, scaled quantization table, and other data as specified in the T.4, Annex G standard, previously incorporated by reference. A printer 240 may be used to provide a confirmation sheet or other record of the transmission as is well known in the art.

One skilled in the art will recognize that the disclosed facsimile-enabled device implementation is exemplary and illustrative and that various changes in the components as well as the details of the illustrated device may be made without departing from the spirit of the invention. For example, a facsimile-capable device can be provided without either the scanner 220 or the printer 240. In addition, the modem 230 can be replaced by any mechanism for data transmission without departing from the spirit of the invention. As another example, caller ID functionality, a speakerphone, and a telephone answering machine can be integrated into the facsimile-capable or enabled device 200. The transmission rate control process can be implemented in a variety of multi-function peripheral devices (typically combining the functions of a printer, copier, scanner, and facsimile device) or facsimile-capable devices without departing from the spirit of the invention.

Figure 3:
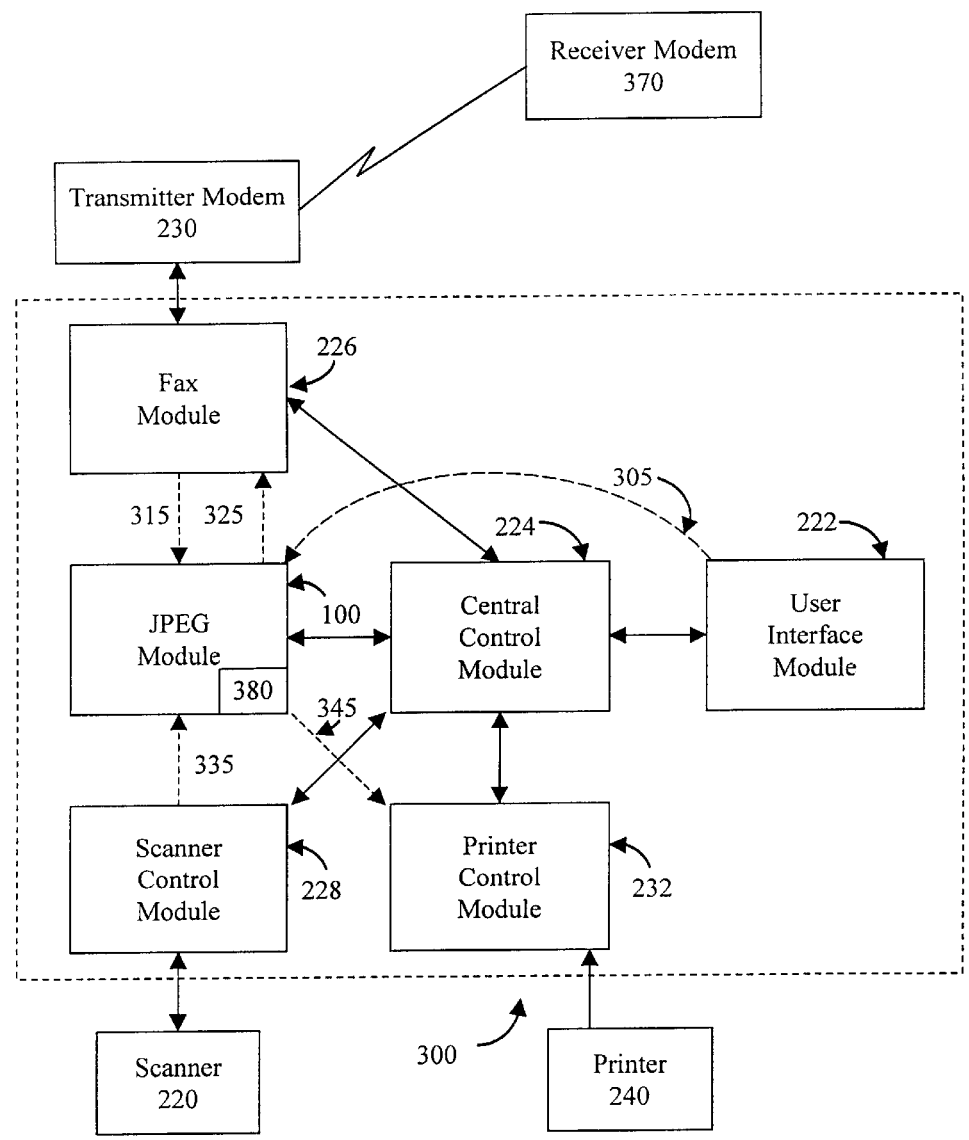
FIG. 3 is a data flow diagram of software modules according to one disclosed embodiment.

Turning to FIG. 3, a data flow diagram of a facsimile firmware code 300 to be executed by the controller 210 is provided. The central control module 224 directs the actions of the firmware 300, communicating as needed to the fax module 226, the JPEG module 100, the scanner control module 228, the printer control module 232, and the user interface module 222, as shown by the solid directional arrows.

Dashed arrows 305, 315, 325,335 and 345 show a logical data flow of an image between some of the modules. One skilled in the art will recognize that the logical data flows are illustrative and explanatory, and actual data flow may take different paths without departing from the spirit of the invention. Data flow 335 indicates that the image data is passed from the scanner control module 228 after being produced by the scanner 220 to the JPEG module 100 as the image is scanned. In one aspect of a disclosed embodiment, the fax module 226 determines a data rate by a well known process of negotiation between the transmitter modem 230 and a receiver modem 370. The data rate is then passed in any fashion known to the art to the JPEG module 100 via logical data flow 315.

The JPEG module 100 uses the data rate to produce a scaling factor, scaling an original set of quantization values 380 to produce a scaled set of quantization values 460 (FIG. 4) which is then used in the well-known JPEG technique to produce a compressed image. Both the original set of quantization values and the scaled set of quantization values 460 may be arranged as a table or in any other convenient way. In one embodiment, each original quantization value is multiplied by the scaling factor to produce a scaled quantization value. One skilled in the art will recognize that numerous approaches to scaling can be used without departing from the spirit of the invention. In a disclosed embodiment, the scaling factor varies inversely with the data rate, producing relatively low scaled quantization values when the data rate is relatively high and relatively high scaled quantization values when the data rate is relatively low. It should be understood that a scaling factor can be created through equivalent mathematical operations to generally accomplish an inverse relationship between the data rate and the scaled set of quantization values 460 and the scaling factor. For example, a data rate of 2400 bits per second may be considered relatively low and a data rate of 14,400 bits per second may be considered relatively high. If the data rate is 2400 bits per second, a scaling factor that is relatively high is generated, producing a scaled set of quantization values that are relatively high. For example, T.81 provides the following example of an original set of quantization values:

TABLE 1

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

If a scaling factor of five is generated based on the relatively low data rate of 2400 bits per second, then the following scaled set of quantization values 460 would be used:

TABLE 2

| 80  | 55  | 50  | 80  | 120 | 200 | 255 | 305 |
|-----|-----|-----|-----|-----|-----|-----|-----|
| 60  | 60  | 70  | 95  | 130 | 290 | 300 | 275 |
| 70  | 65  | 80  | 120 | 200 | 285 | 345 | 280 |
| 70  | 85  | 110 | 145 | 255 | 435 | 400 | 310 |
| 90  | 110 | 185 | 280 | 340 | 545 | 515 | 385 |
| 120 | 175 | 275 | 320 | 405 | 520 | 565 | 460 |
| 245 | 320 | 390 | 435 | 515 | 605 | 600 | 505 |
| 360 | 460 | 475 | 490 | 560 | 500 | 515 | 495 |

If the data rate is 14,400 bits per second, a scaling factor that is relatively low is generated, producing a scaled set of quantization values 460 that are relatively low. Using the examplary original set of quantization values provided above, if a scaling factor of one is generated based on the relatively high data rate, then the scaled set of quantization values 460 is identical to the original set of quantization values. One skilled in the art would recognize that the illustrated scaling factor and sets of quantization values are exemplary and illustrative and other scaling factors and sets of quantization values could be used without departing from the spirit of the invention.

The compressed image is then sent via a logical data flow 325 to the fax module 226 for transmission by the transmitter modem 230. A record oft he transmission may be sent via logical data flow 345 to the printer control module 232 for printing on printer 240.

A user interacting with user interface module 222 can control the actions of the JPEG module 100, enabling or disabling a rate control mode as indicated by a logical data flow 305. When the rate control mode is disabled the JPEG module 100 produces a compressed image using a scaled set of quantization values 460 identical to the original set of quantization values 380. When the rate control mode is enabled, the JPEG module 100 produces a compressed image using a scaled set of quantization values 460 to compress the image based on the data rate.

Figure 4:
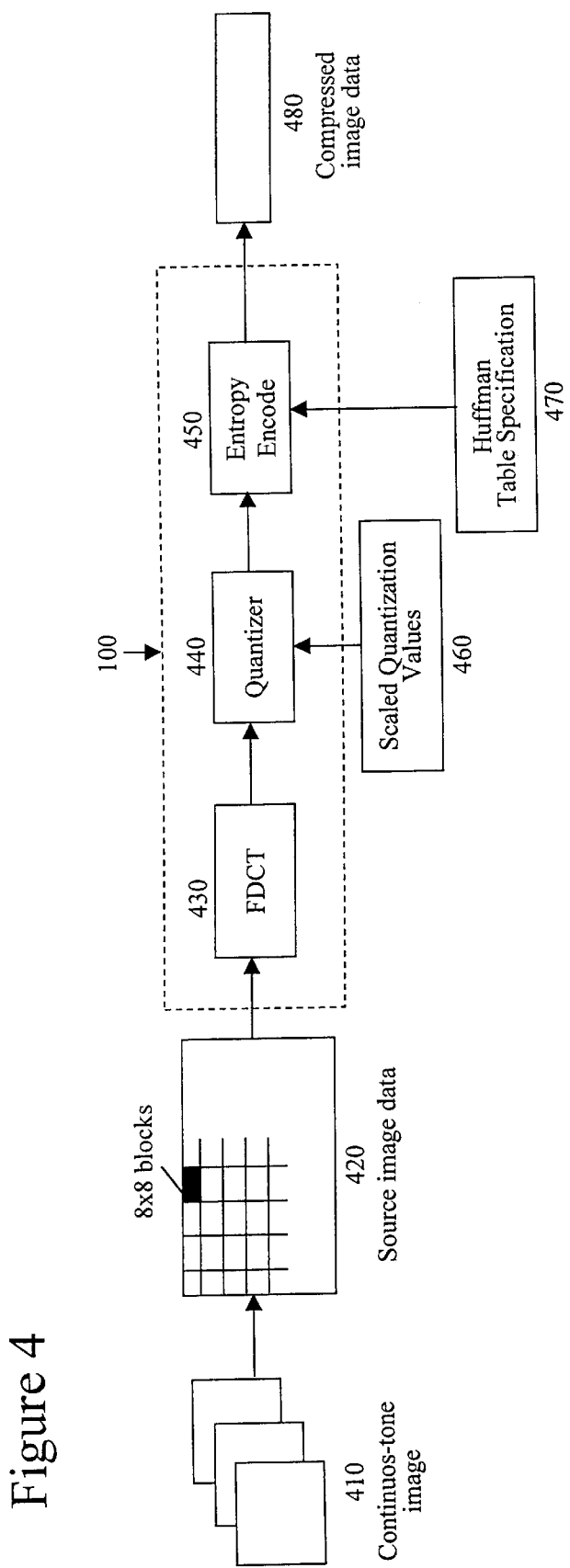
FIG. 4 is a data flow diagram of a JPEG encoder.

Turning to FIG. 4, a data flow diagram of an exemplary JPEG compression technique is shown according to the T.81 standard previously incorporated by reference. A continuous-tone image 410 to be transmitted is converted into a source image data 420. If the continuous-tone image is a gray-scale image, then the source image data 420 will have a single component; if the continuous-tone image 410 is a color image, then the source image data 420 will have three components, one luminance component and two chrominance components. Each component is separately compressed, and the following description applies identically to each component. The source image data 420 are grouped into 8×8 blocks, and each block is transformed by a forward discrete cosine transform (FDCT) 430 into a set of 64 values referred to as DCT coefficients. Each of the 64 DCT coefficients is then quantized using one of 64 corresponding values from a scaled set of quantization values 460. After quantization, the DCT coefficients are prepared for entropy encoding and then passed to an entropy encoder 450 which compresses the data further, using a Huffman table specification 470. Finally, the compressed image data 480 are output by the JPEG compression module 100.

Figure 5:
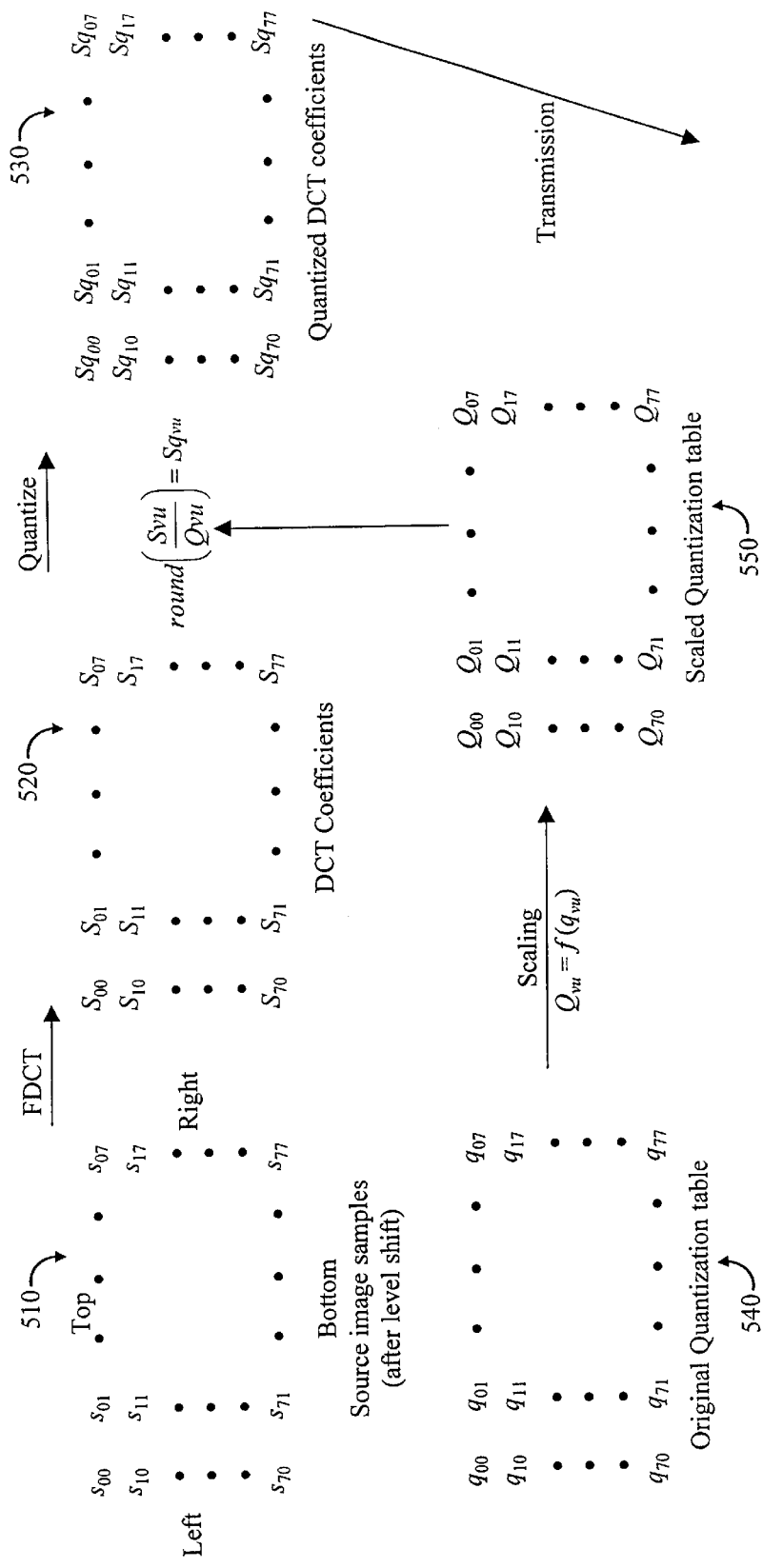
FIG. 5 is a data flow diagram illustrating the relationship between samples of data in an image and quantized DCT coefficients according to one aspect of a disclosed embodiment.

Turning to FIG. 5, an exemplary relationship between samples of data in an image and quantized DCT coefficients is shown. Array 510 is an 8×8 array of source image data for the FDCT computations. According to the JPEG standard, the source image sample data has been level-shifted to a signed representation by subtracting 127 or 2047 (depending on whether the baseline or extended DCT technique is used) from each member of the array 510 if the baseline DCT technique is used. Then the FDCT transformation is performed, producing the DCT coefficients array 520. An original set of quantization values 380 in the original quantization table 540 of 64 elements ($q_{00}$–$q_{77}$) is scaled to produce a scaled set of quantization values 460 in the scaled quantization table 550 ($Q_{00}$–$Q_{77}$). More particularly, each quantization value $q_{vu}$ of the original set of quantization values 380 is multiplied by a scaling factor f to produce a scaled quantization value $Q_{vu}$ of the scaled set of quantization values 460 in the scaled quantization table 550. The scaling equation is shown in FIG. 5 as $Q_{vu}=f(q_{vu})$. The scaled quantization table 550 is then used to scale the DCT coefficients 520 by dividing each DCT coefficient 520 by the corresponding member of the scaled set of quantization values 460 and rounding the result to an integer value, producing the quantized DCT coefficients 530. As described in FIG. 4, the quantized DCT coefficients 530 can then be encoded using Huffman encoding and transmitted.

The illustrated rate control technique is advantageous in situations where the absolute quality of the transmitted facsimile image is less critical than the time required to transmit the original continuous-tone image. For example, in many business situations the quality of the color image to be transmitted via facsimile is not as important as the time required to complete the facsimile transmission. A real estate agent wishing to send color images of a house to multiple clients may be willing to sacrifice image quality for a shorter transmission time when the recipients have relatively slow facsimile devices.

While the disclosed rate control technique is described herein in the context of quantization tables, it should be understood that other representations and arrangements of quantization values can be used. In addition, the rate control technique can be applied to other (i.e., non-JPEG) compression techniques. Further, it should be understood that the rate control technique can accomplish scaling of quantization values based on a data rate in a variety of ways with or without use of a scaling factor.

The foregoing disclosure and description of the various embodiments are illustrative and explanatory thereof, and various changes in the descriptions of the methods, the organization of the components, and the order and timing of the steps taken, as well as the details of the illustrated system may be made without departing from the spirit of the invention.

I claim:

1. A method of transmission rate control for a continuous-tone image, the steps comprising:

negotiating a data rate between a transmitter and a receiver; and scaling an original set of quantization values based on the data rate to produce a scaled set of quantization values.

2. A method as in claim 1, the step of scaling the original set of quantization values based on the data rate comprising the steps of:

computing a scaling factor from the data rate; and scaling the original set of quantization values with the scaling factor to produce the scaled set of quantization values.

3. A method as in claim 1, further comprising the steps of:

producing a compressed continuous-tone image using the scaled set of quantization values.

4. A method as in claim 3, further comprising the step of:

transmitting the compressed image and the scaled set of quantization values.

5. A method as in claim 1, further comprising the steps of:

activating a rate control mode to enable the scaling step; and deactivating the rate control mode to disable the scaling step.

6. A method as in claim 5, wherein, if the rate control mode is deactivated, the scaling step produces a scaled set of quantization values identical to the original set of quantization values.

7. A method as in claim 1, the scaling step comprising the steps of:

increasing each value of the original set of quantization values by a relatively large amount if the data rate is relatively slow; and increasing each value of the original set of quantization values by a relatively small amount if the data rate is relatively fast.

8. A computer program embedded in a computer-readable medium adapted to scale an original set of quantization values based on a data rate, comprising:

code to receive the data rate; and code to scale the original set of quantization values based on the data rate to produce a scaled set of quantization values.

9. A computer program embedded in a computer-readable medium as in claim 8, the code to scale an original set of quantization values comprising:

code to generate a scaling factor from the data rate; and code to scale the original set of quantization values with the scaling factor to produce the scaled set of quantization values.

10. A computer program embedded in a computer-readable medium as in claim 9, the code to create a scaling factor from the data rate comprising:

code to generate relatively high scaled quantization values if the data rate is relatively slow; and code to generate relatively low scaled quantization values if the data rate is relatively fast.

11. A computer program embedded in a computer-readable medium as in claim 9, wherein the code to generate a scaling factor based on the data rate generates a scaling factor which varies inversely with the data rate.

12. A computer program embedded in a computer-readable medium as in claim 8, further comprising:

code to receive a continuous-tone image; and code to compress the continuous-tone image with the scaled set of quantization values, producing a compressed continuous-tone image.

13. A computer program embedded in a computer-readable medium as in claim 12, further comprising:

code to output the compressed continuous-tone image and the scaled set of quantization values.

14. A computer program embedded in a computer-readable medium as in claim 8, further comprising:

code to activate and deactivate the code to scale the original set of quantization values.

15. A computer program embedded in a computer-readable medium as in claim 14, wherein if the code to scale the original set of quantization values is deactivated, the scaled set of quantization values is identical to the original set of quantization values.

16. A continuous-tone facsimile-capable mechanism adapted to transmit a continuous-tone image for facsimile transmission, comprising:

a means for determining a data rate; and a scaling mechanism to scale an original set of quantization values based on the data rate comprising:

a means for receiving the data rate; and a means for generating a scaled set of quantization values from an original set of quantization values based on the data rate.

17. A mechanism as in claim 16, the means for generating a scaled set of quantization values comprising:

a means for computing a scaling factor based on the data rate; and a means for scaling the original set of quantization values with the scaling factor to generate the scaled set of quantization values.

18. A mechanism as in claim 16, further comprising:
a means for receiving the continuous-tone image; and
a means for compressing the continuous-tone image using the scaled set of quantization values to produce a compressed continuous-tone image.

19. A mechanism as in claim 18, further comprising:
a means for transmitting the compressed continuous-tone image and the scaled set of quantization values.

20. A mechanism as in claim 16, further comprising:
a means for activating and deactivating a rate control mode, wherein if the rate control mode is deactivated, the means for generating a scaled set of quantization values from the original set of quantization values is deactivated.

21. A mechanism as in claim 20, wherein if the rate control mode is deactivated, the means for generating a scaled set of quantization values generates a scaled set of quantization values identical to the original set of quantization values.

22. A mechanism as in claim 16, wherein the means for generating a scaled set of quantization values produces a set of relatively high scaled quantization values if the data rate is relatively low and a relatively low scaled set of quantization values if the data rate is relatively high.

23. A mechanism as in claim 16, wherein the scaled set of quantization values varies inversely with the data rate.

* * * * *

UNITED STATES PATENT AND TRADEMARK OFFICE
CERTIFICATE OF CORRECTION

PATENT NO. : 6,771,393 B1
DATED : August 3, 2004
INVENTOR(S) : Hooman Honary

It is certified that error appears in the above-identified patent and that said Letters Patent is hereby corrected as shown below:

Column 8,
Line 17, delete "the scaling" and insert -- a scaiing --.
Line 20, delete "a" and insert -- the --.
Line 28, delete "a scaling factor" and insert -- the scaling factor --.

Signed and Sealed this

Twenty-first Day of February, 2006

JON W. DUDAS
*Director of the United States Patent and Trademark Office*